Figure 13:
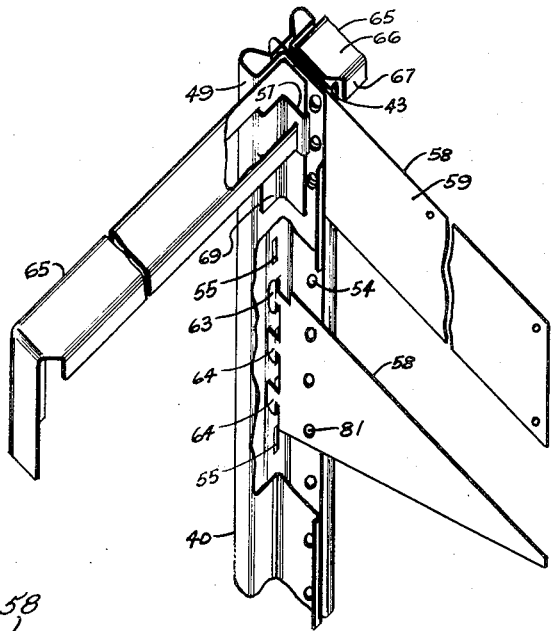

Oct. 12, 1954
V. H. JONES
2,691,502
FRAMEWORK FOR STORE FIXTURES
Filed Jan. 6, 1949
5 Sheets-Sheet 1
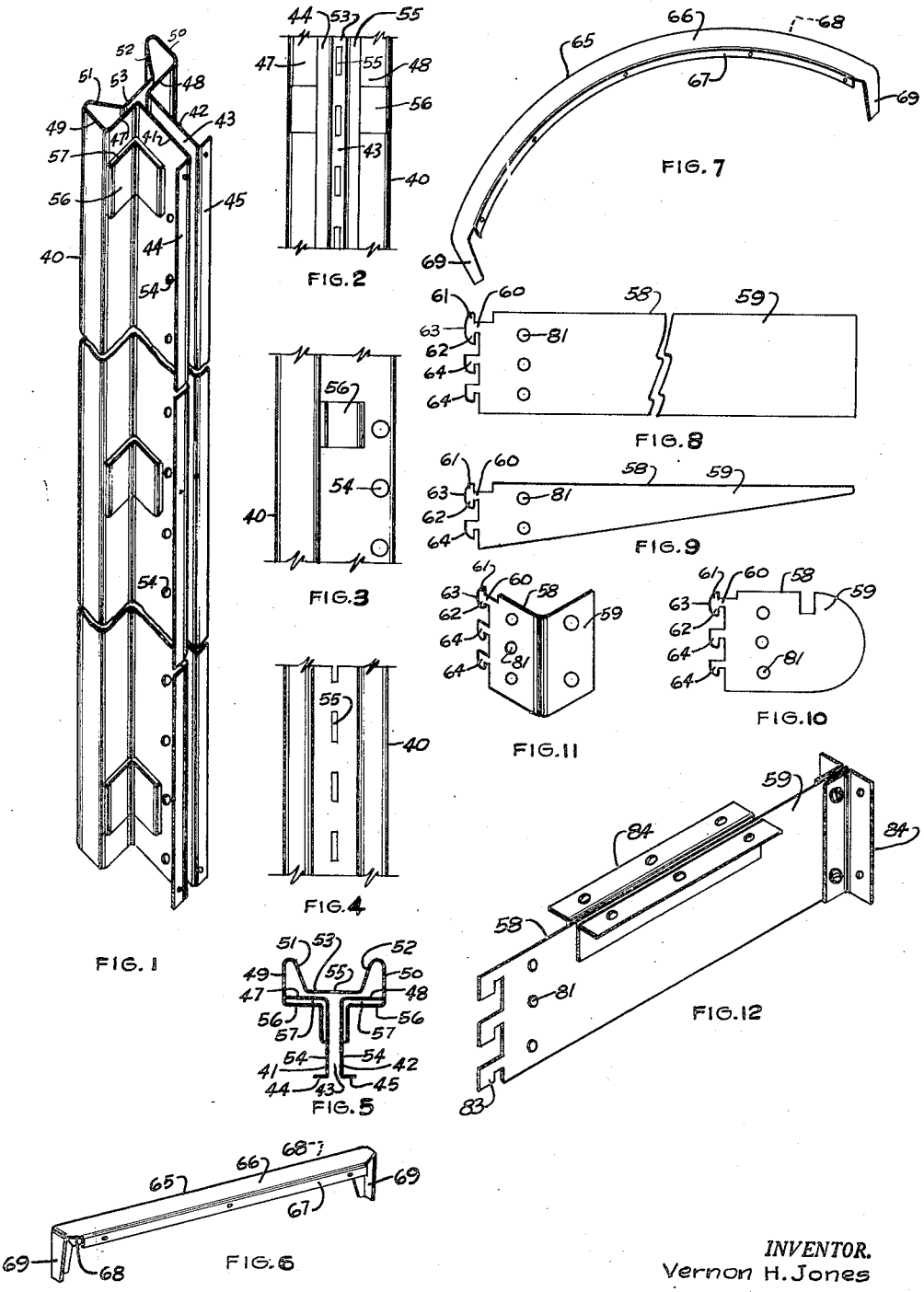
INVENTOR.
Vernon H. Jones Oct. 12, 1954     V. H. JONES     2,691,502
FRAMEWORK FOR STORE FIXTURES
Filed Jan. 6, 1949     5 Sheets-Sheet 2

INVENTOR.
Vernon H. Jones

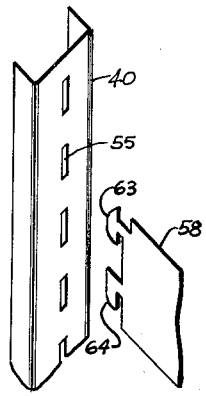
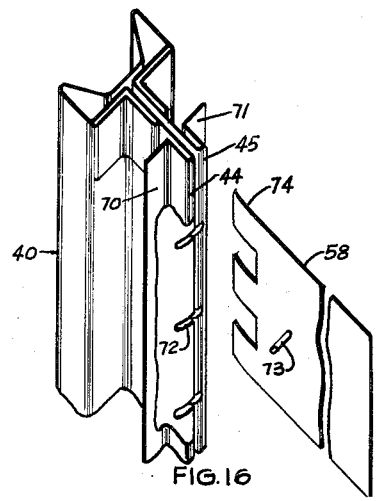
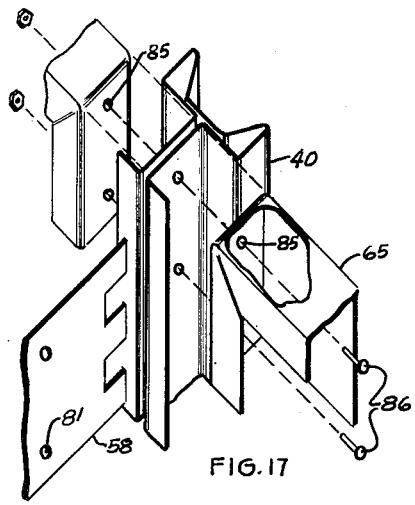
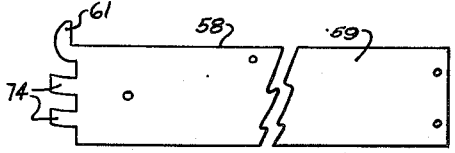
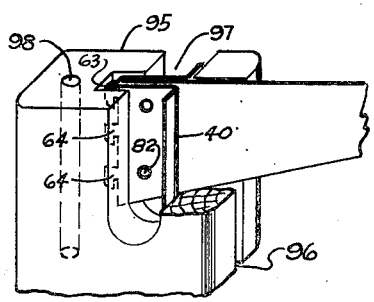

INVENTOR.
Vernon H. Jones

Oct. 12, 1954   V. H. JONES   2,691,502
FRAMEWORK FOR STORE FIXTURES
Filed Jan. 6, 1949   5 Sheets-Sheet 5

INVENTOR.
Vernon H. Jones
BY

Patented Oct. 12, 1954

2,691,502

UNITED STATES PATENT OFFICE 2,691,502

FRAMEWORK FOR STORE FIXTURES

Vernon H. Jones, Silver Lake, Ohio

Application January 6, 1949, Serial No. 69,580

4 Claims. (Cl. 248—243)

My invention relates to new and improved strut, bracket and connecting members, forming the framework for store fixtures.

Among the objects of my invention is to create a functional strut with interchangeable cantilever brackets and fittings for store fixtures, the strut so designed that it will receive extra strong pressure or weight against its length without noticeable bend; and each interchangeable bracket and fitting so designed and constructed that one end will fit and lock into the strut at various points to form an angle extension or support for holding bases, table tops, shelves, cabinets, cornices and the like, which in turn will hold and display large quantities of heavy merchandise, thus ending up with a free-standing device having the appearance of a wall or partition with deep projecting shelves, holding displays of merchandise and yet with no support for these projections other than the joint or union between the strut and the ends of the brackets; to create straight and curved connecting members for attaching one strut to another which will lock into place and then form a series of solid rectangular or square frames which will serve to support background panels which can be mounted thereon, thus creating the effect of attractive wall or partition with all the framework hidden from view.

Further objects of my invention are to create a strut having two projecting parallel surfaces with space between to receive ends of brackets or fittings which can be locked in place in slots at the back of the opening as well as in between the two parallel surfaces, thus creating a solid joint between the strut and the bracket with extra resistance to leverage and strain; to create a strut having two projecting right angles with space between them forming a channel for receiving brackets and fittings, the angle surfaces of which would serve for attaching attractive background panels leaving a small space between their edges for receiving brackets and fittings which would fasten into the strut behind the panels, thus creating the effect of a complete plain appearing wall or partition without adding unsightly slotted pilasters such as are often attached on the front of panels and are usually necessary for use when attaching brackets; to create a strut for forming framework which, depending upon the desire of the user, can be attached direct to the building walls, as is usually necessary, or can be used as a free-standing unit which does not become a part of the building property in a case of moving to a new location; to create a strut, connecting members, brackets and fittings which, when used in combination to form framework for receiving suitable covering material, can be made to form attractive display facilities consisting of such items as a back wall or partition with lighted cornice, also with platforms, bases, shelves and the like which form the effect of costly display fixtures such as a table in front of a wall panel which would ordinarily have legs or some other type of supporting enclosure; to create interchangeable brackets and fittings with hook designs on one end for fitting into slots of struts easily but, because of one peculiarly shaped hook, the bracket or fitting will not fall out of place when it is accidentally jarred.

It is further among the objects of my invention to create brackets and fittings with two or more hook projections which fit into the slots of a strut, one of which is shaped like a double hook facing in opposite directions to take full advantage of the bearing surfaces above and below one of the slots in the strut, thus making it difficult to tear out the slot without excessive leverage, which is easy to do with many bracket and slot arrangements of the past; to create brackets and fittings with hook or teeth designs on one end which fit into slots of struts, and in addition with one or more holes through the side, through which a bolt or lug can be inserted so as to extend through the holes located in the parallel side walls of the open channel in the strut which is located between the two projecting angles, thus creating an extra locking arrangement between the strut and bracket or fitting at the point of greatest strain which can be used when attaching what might be considered as semi-permanent brackets or fittings to the strut such as those necessary to hold cornice and base, which usually remain without change, and also shelves used like table tops for extra heavy displays of merchandise; to create struts, connecting members, brackets and fittings which when used as framework in combination with suitable covering material will serve to modernize a sales area in a store, by providing attractive functional display facilities at minimum cost; to create a basis for flexible interchangeable displays to be handled by store people without the necessity of costly construction alterations, by having brackets and fittings which can be removed from struts quickly and easily, and such other objects, advantages and capabilities as will later more fully appear and which are inherently possessed by my invention.

While I have shown in the accompanying drawing a preferred embodiment of my invention, yet it is understood that the same is susceptible of modification and change without departing from the spirit of my invention.

Figure 14B:
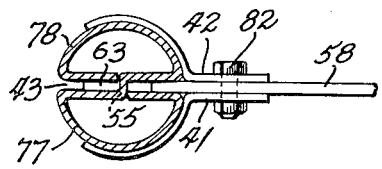
Figure 14:
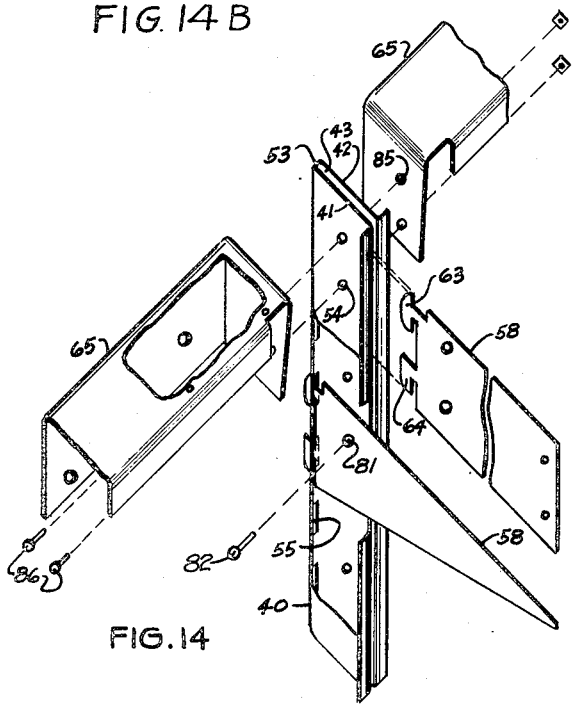
Figure 14A:
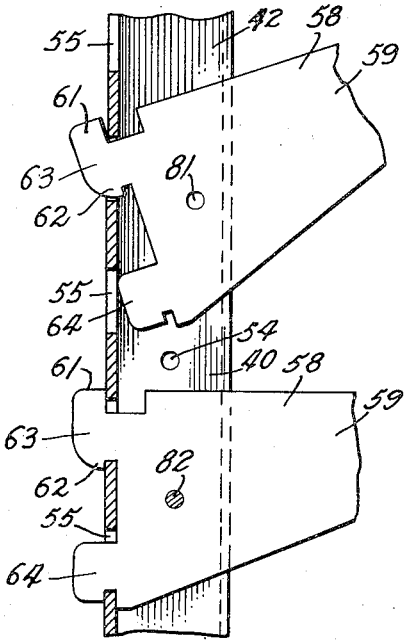
Figure 26:
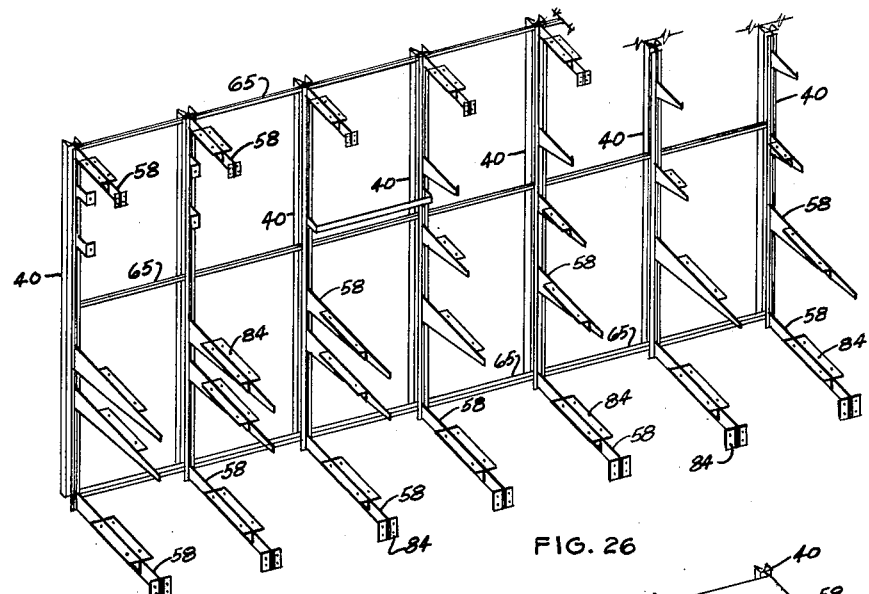
Figure 27:
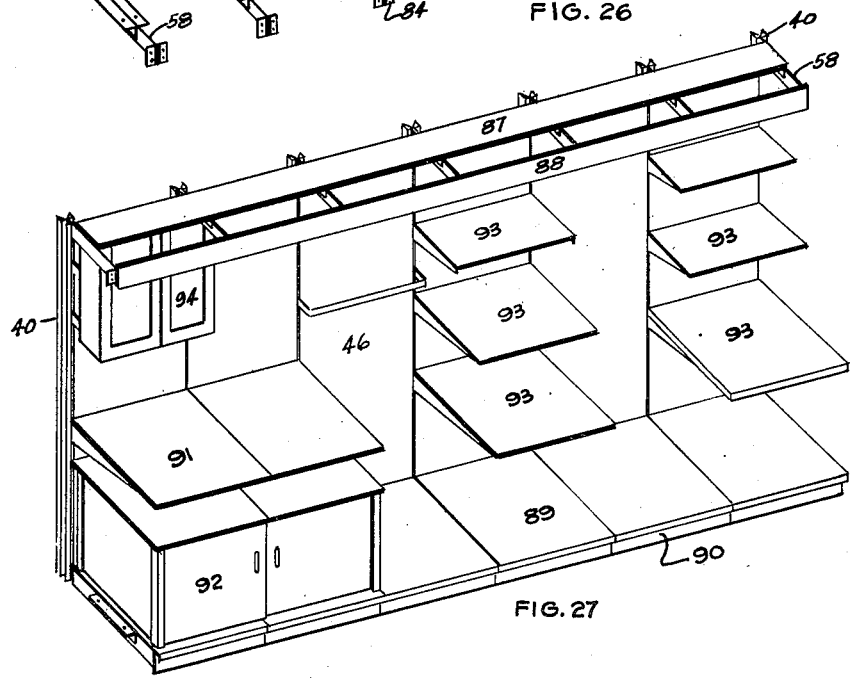
Figure 28:
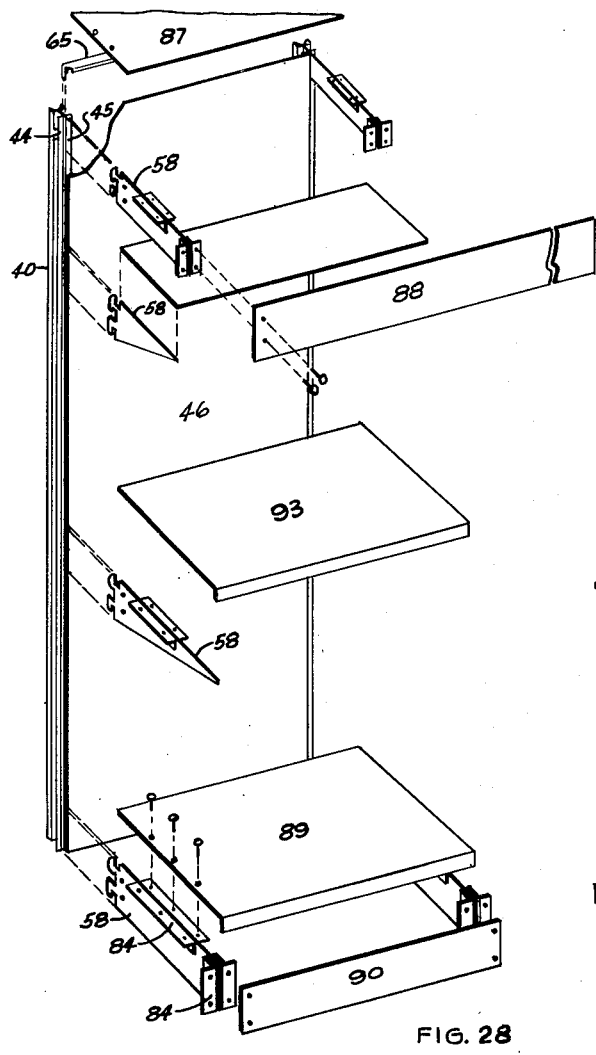
Figure 29:
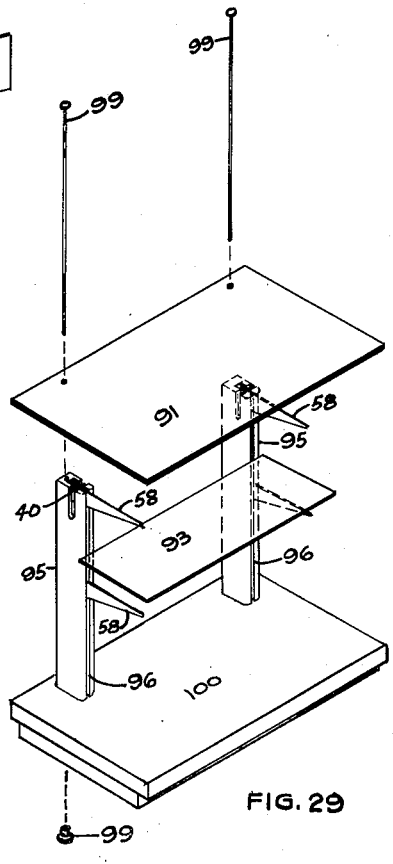
Figure 30:
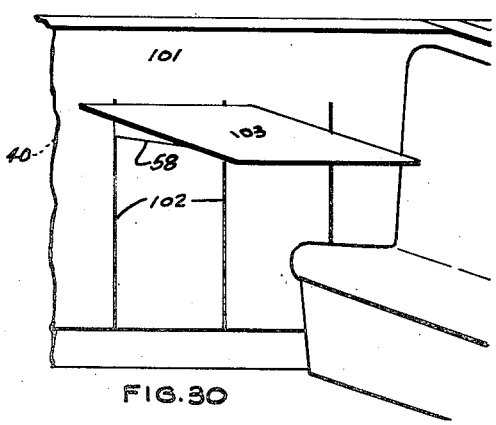

Referring to the drawings, Fig. 1 is a perspective detailed view of a preferred embodiment of my strut cut in three sections to illustrate center and end portions; Fig. 2 is a detailed front elevation covering section of the strut illustrated in Fig. 1; Fig. 3 is a detailed side view elevation covering a section of the strut illustrated in Fig. 1; Fig. 4 is a detailed back view elevation covering a section of the strut illustrated in Fig. 1; Fig. 5 is a top view of the strut shown in Fig. 1; Fig. 6 is a perspective view of a straight connecting member; Fig. 7 is an elevation view of a curved connecting member; Figs. 8, 9, 10 and 11 are side elevational views of different forms of my brackets having hooks, one of which is peculiarly shaped, with double hook arrangement facing top and bottom; Fig. 12 is a perspective view of a base or cornice bracket with teeth-like projections on one end which fit snugly into slots of struts before being bolted into place, and attached angle members which serve to reinforce the bracket and also to provide means for attaching covering materials; Fig. 13 is an enlarged perspective view of the union or joint between a preferred form of my strut, a typical assortment of brackets and fittings, and my connecting members with a wedge-shaped angle which fit into V-shaped slot of the strut; Fig. 14 is an exploded view of the union or joint between a preferred form of my strut, typical brackets and fittings, and also my connecting members with right angle end portions designed with holes to receive bolts for attaching the connecting members to the strut; Fig. 14A is a cut-away sectional view of the strut and bracket in Fig. 14; Fig. 14B is a sectional view of the strut further shown in Fig. 22; Fig. 15 is a cut-away perspective view illustrating the use of a bracket with my hook construction with a conventional plain slotted standard; Fig. 16 is a cut-away perspective view of another form of my strut and bracket or fitting; Fig. 17 is a cut-away perspective exploded view of one form of union or joint between strut, connecting members with right angle ends and holes for bolting, and a cornice bracket; Fig. 18 is a sectional top view of simple strut form; Fig. 19 is a sectional top view of a strut form with the right angle facings set back to hold covering panel in place; Fig. 20 is a sectional top view of a strut form made of pieces fastened together, with the underside of the cross bar of the T forming the right angle facings for receiving covering background panels; Fig. 21 is a sectional top view of an extruded strut form with a slotted insert added to provide slots at the back of channel opening; Fig. 22 is a sectional top view of a round double faced strut to hold brackets and fittings facing in opposite directions; Fig. 23 is a sectional top view of a double faced strut to hold brackets and fittings facing in opposite directions, and also to hold and separate double faced background panels; Fig. 24 is an elevational view of a different embodiment of my bracket; Fig. 25 is an elevational view partly in section showing how my strut and bracket can be used in connection with vertical members or covering material such as a table leg; Fig. 26 is a front perspective view of seven struts joined together with connecting members and with an assortment of brackets and fittings in place, to form a typical arrangement of framework for store fixtures; Fig. 27 is the same view of the same framework for store fixtures illustrated in Fig. 26 except that here covering materials such as back panels, base tops, cornice facing and shelf tops have been added to the framework to form a typical arrangement of completed store fixtures; Fig. 28 is an exploded view showing how struts, connecting members and an assortment of brackets and fittings are joined together to form one section of framework for store fixtures, also how covering materials are added to the framework so as to make one typical assembly of a completed wall type store fixture; Fig. 29 is an exploded view of a free-standing table assembly where struts and brackets are used in connection with two vertical members such as a table leg to support a shelf and table top; and Fig. 30 is a perspective view showing how my struts and brackets can be used to support table tops for restaurant store fixtures.

The embodiment selected to illustrate my invention comprises a strut 40, which in a preferred form as shown in Fig. 1 has a pair of substantially parallel side walls 41 and 42 separated by space 43. At the front ends of side walls 41 and 42, strut 40 has right angle facings 44 and 45 extending in opposite directions. These facings serve to strengthen the strut and to receive covering background panels 46 to be later more fully described. At the rear ends of side walls 41 and 42 strut 40 is bent outwardly to form front portions 47 and 48, rearwardly to form end portions 49 and 50, diagonally inwardly to form diagonal portions 51 and 52 with straight rear connection portions 53. The side walls 41 and 42 have a plurality of vertically spaced matching holes 54.

In rear portion 53 are a plurality of vertically spaced, vertically elongated slots 55.

A plurality of vertically spaced straps 56 are attached to strut 40 on either side thereof with the opposite ends of the straps 56 on one side attached to side wall 41 and end portion 49 and on the other side to side wall 42 and end portion 50. The straps 56 are spaced intermediate their ends from side walls 41 and front portion 47 and side wall 42 and front portion 48 to form V-shaped slots 57.

My bracket 58 in its preferred form has a body portion 59, and integral therewith at its inner edge a rearward extension 60 with an upwardly extending hook portion 61 and a downwardly extending hook portion 62, forming a double hook 63. My bracket 58 also has one or more single hooks 64 spaced vertically below double hook 63. Each single hook 64 consists of the extension 60 rearward of bracket 58, and the downwardly extending hook portion 62.

Bracket 58 is adapted to be moved rearwardly at an angle within space 43 until hooks 63 and 64 are positioned in slots 55. Double hook 63 cannot be accidently removed by merely jarring strut 40. Double hook 63 bears against rear portion 53 of strut 40 above as well as below the slot 55 through which it has passed.

Connecting member 65 has a body portion 66, a downwardly extending right angled facing portion 67, a downwardly extending right angled rear portion 68 and at each end a V-shaped angle 69. Connecting members 65 are removably attached to struts 40 by sliding V-shaped angles 69 down into V-shaped slots 57.

In use, my struts 40, brackets 58 and connecting members 65 form the basis for a framework for store fixtures. These parts have variations in form, which come within the spirit of my invention.

My strut 40 as shown in Fig. 16 has the usual portions hereinbefore set forth and beyond facings 44 and 45 the strut is bent back to form right angle corners 70 and 71. A plurality of vertically spaced horizontal or angular slots 72 are cut through the side walls 41 and 42 and extend slightly into facings 44 and 45. These slots 72 are adapted to receive horizontally extending lug 73 extending through the inner end portion of bracket 58 as shown in Fig. 16. The vertically spaced projections 74 on the inner end of bracket 58 fit into slots 55. This provides a combination of strut and cantilever bracket which will resist strain and make bolting unnecessary. With this construction it is not necessary to remove background panels in order to bolt a bracket in place, because the lug takes the place of the bolt.

There are several embodiments of my strut 40. In Fig. 18 there are the facings 44 and 45, and the side walls 41 and 42 with space 43 and holes 54, and said walls are connected by a curved rear portion 53 with slots 55. In Fig. 19 there are the side walls 41 and 42, with space 43, holes 54, front portions 47 and 48, and portions 49 and 50, diagonal portions 51 and 52 and connecting rear portion 53 with slots 55. At the other end of side walls 41 and 42, strut 40 is bent back on itself and then at right angles to form recessed facings 44 and 45.

Fig. 20 shows side walls 41 and 42 with holes 54, front portions 47 and 48 and end portions 49 and 50. A rear connecting member 53 is attached to the rear of front portions 47 and 48 and has slots 55.

Fig. 21 is similar to Fig. 20 with facings 44 and 45 provided, and front extensions 75 and 76.

There are instances when it is desirable to have a double faced strut. In Fig. 22 the strut 40 has a pair of semi-rounded portions 77 and 78 with space 43, with connecting portions 53 having slots 55. In Fig. 23 the semi rounded portions 77 and 78 have indentations 79 and 80 to receive panels 46.

In my bracket 58, the body portion 59 may differ as to shape, as shown in Figs. 8, 9, 10 and 11. The body portion 59 has a plurality of spaced holes 81 which line up with holes 54 in strut 40 to receive bolts 82 for creating a more solid unit between strut and bracket to resist leverage and strain.

In Fig. 24 my bracket 28 has an upwardly curved hook portion 61 at the inner upper corner, and vertically spaced projections 74 and holes 81 in the body portion 59.

Projections 74 may be straight or slightly curved.

As shown in Fig. 12, bracket 58 has tooth like projections 83 extending beyond body portion 59. Right angles 84 are attached to the upper and outer portions of body portion 59 to support shelves, table tops and the like.

Connecting members 65 have openings 85 in their V-shaped angles in line with holes 54 in struts 40 to receive bolts 86 for attaching said members together, as shown in Figs. 14 and 17.

In assembling framework for wall type store fixtures, a plurality of struts 40 are provided. To these struts brackets 58 are attached at the top for cornices, at the bottom for bases and in between. Some of the brackets may have right angles 84 attached thereto. Other fittings having attachment means similar to brackets 58 may be attached to struts 40. Connecting members 65 are attached to struts 40, and the framework is formed, as illustrated in Fig. 26. To this framework are added coverings to form the completed store fixture as shown in Fig. 27. Such coverings are shown in detail in the exploded view of Fig. 28. In this view, a cornice top 87 lies on and is attached to right angles 84 on top brackets 58. A cornice facing 88 is attached to the front right angles 84 of top brackets 58. Background panels 46 are attached to facings 44 and 45. Base tops 89 lie on and are attached to right angles 84 on bottom bracket 58. Base facings 90 are attached to front right angles 84 of bottom brackets 58.

Table tops 91, table enclosures 92, shelves 93 are also mounted on and attached to right angles 84 of brackets 58 as shown in Fig. 27. Brackets 58 may also carry cabinets 94. These additions to my struts, brackets and connecting members may be varied to form fixtures as desired.

In assembling floor type tables my struts 40 may be used with or without connection to a vertical member such as a table leg 95 having an opening or space 96 which is in alignment with space 43 of strut so as to receive brackets 58; also a cut-away section or hole 97 in each side of leg member so as to provide space for inserting bolt 82 through matching holes 54 located in side walls of strut; also bolt hole 98 running lengthwise through the leg members for receiving long bolt 99 for fastening leg members in a rigid upright position to base support 100. Some of the brackets 58 may then be attached to the struts 40 at various heights for holding a table top 94 and shelf 93 as shown in Fig. 29.

In assembling restaurant type wall table fixtures two struts 40 are mounted to a wall at reasonable distances apart then covered with wall paneling 101. Brackets 58 with right angles 84 are inserted in and bolted to struts 40 so as to extend from wall through wall panel openings 102 at table height, on to which a restaurant table top 103 is attached thus completing an arrangement such as shown in Fig. 30.

It is within the contemplation of my invention that my strut and brackets be used without connecting members. In such cases the struts are fastened to a wall or other separating structure so as to hold the struts parallel and evenly spaced apart and perform the same functions as with connecting members.

Having thus described my invention, I claim:

1. In a framework for store fixtures an upright member having a rear portion with a plurality of recessed spaced slots, and a pair of side walls extending forwardly of said rear portion and spaced from each other to form an open channel located in front of the recessed spaced slots and leading to the spaced slots, said side walls having matched spaced holes, a bracket having a body portion with a plurality of downwardly extending hook projections on one end, the upper of said projections also having an upwardly extending hook portion so as to create one double hook which is located above the horizontal line of center on the bracket, said projections adapted to fit into the slots of the upright member, said double hook having two straight unbeveled bearing surfaces adapted to press directly against the back surface of the upright member to strengthen the joint at the point of greatest strain when downward pressure of weight is applied on top of bracket while it is engaged in the upright member to create a cantilever support adapted to support a heavy load, said body portion of said bracket also having a hole adapted to receive a bolt therethrough, said matching holes of the upright side walls also adapted to receive the same bolt so that the bracket will be rigidly engaged in the upright by being hooked in slots and by being bolted in place at the same time, with the side walls having a tight bearing against each side of the bracket.

2. In a framework for store fixtures an upright member having a rear portion with a plurality of recessed spaced slots and a pair of side walls extending forwardly of said rear portion and spaced from each other to form an open channel located in front of the recessed spaced slots and leading to the spaced slots, said side walls having sufficient flexibility to be drawn together to serve as clamps, said side walls having matched spaced holes, a bracket having a body portion with a plurality of spaced projections on one end adapted to fit into the slots of the upright member, the upper of said projections having upwardly and downwardly extending hook portions with straight unbeveled inner face edges, said hook portions located entirely above the horizontal line of center of the bracket so that both of the straight unbeveled face edges of said upwardly and downwardly extended hook portions press directly against the back surface of upright member to strengthen the joint at the point of greatest strain when downward pressure of weight is applied on top of bracket while it is engaged in the upright member to create a cantilever support adapted to support a heavy load, said bracket body portion also having a hole adapted to receive a bolt therethrough, said matching holes of the upright side walls also adapted to receive the same bolt so that the bracket will be rigidly engaged in the upright by being hooked in slots and by being bolted in place at the same time, with the side walls having a tight bearing against each side of the bracket.

3. In a frame-work for store fixtures an upright member having a rear portion with a plurality of recessed spaced slots, a pair of side walls extending forwardly of said rear portion and spaced from each other to form an open channel located in front of the recessed spaced slots and leading to the spaced slots, said side walls having sufficient flexibility to be drawn together to serve as clamps, said side walls having matched spaced holes, a bracket having a body portion with a plurality of spaced hook projections on one end adapted to fit into the slots of said upright member, the upper of said projections being located above the horizontal line of center of the bracket, and being shaped as a double hook having upwardly and downwardly extending hook portions, with straight unbeveled inner edges adapted to bear directly against an inside portion of the upright, one above and the other below the slot into which the bracket is fitted so as to resist forward thrust to strengthen the joint at the point of greatest strain under downward pressure of weight while the bracket is engaged in the upright member to create a cantilever support adapted to support a heavy load, said bracket body portion also having a hole adapted to receive a bolt therethrough, said matching holes of the upright side walls also adapted to receive the same bolt so that the bracket will be rigidly engaged in the upright member by being hooked in slots and by being bolted in place at the same time with the side walls having a tight bearing against each side of bracket.

4. In a framework for store fixtures an upright member having a rear portion with a plurality of recessed spaced slots, a pair of removable side walls, extending forwardly of said rear portion and spaced from each other to form an open channel located in front of said recessed spaced slots and leading to the spaced slots, said side walls having sufficient flexibility to be drawn together to serve as clamps, said side wall clamps having matched spaced holes, a bracket having a body portion with a plurality of downward extending projections on one end, the upper of said projections also having an upwardly extending hook portion so as to create one double hook which is located above the horizontal line of center on the bracket, said projections adapted to fit into the slots of the upright member, said double hook having two straight unbeveled bearing surfaces adapted to press directly against the back surface of the upright member to strengthen the joint at the point of greatest strain when downward pressure of weight is applied on top of bracket while it is engaged in the upright member to create a cantilever support adapted to support a heavy load, said bracket body portion also having a hole adapted to receive a bolt therethrough, said matching holes of the upright side wall clamps also adapted to receive the same bolt so that the bracket will be rigidly engaged in the upright by being hooked in slots and by being bolted in place at the same time, with the side wall clamps having a tight bearing against each side of the bracket.

References Cited in the file of this patent

UNITED STATES PATENTS

| Number | Name | Date |
|---|---|---|
| 826,621 | Sticht | July 24, 1906 |
| 925,677 | Belcher | June 22, 1909 |
| 1,371,256 | Michaelson | Mar. 15, 1921 |
| 1,685,336 | Platt | Sept. 25, 1928 |
| 1,978,636 | Keil | Oct. 30, 1934 |
| 2,013,118 | Vershbow | Sept. 3, 1935 |
| 2,044,642 | Slater | June 16, 1936 |
| 2,086,009 | Walker | July 6, 1937 |
| 2,230,247 | Henning | Feb. 4, 1941 |
| 2,379,752 | Schultz | July 3, 1945 |
| 2,453,254 | Odin | Nov. 9, 1948 |
| 2,477,735 | Gentile | Aug. 2, 1949 |